US010068217B1

(12) United States Patent
Gopalakrishnan et al.

(10) Patent No.: US 10,068,217 B1
(45) Date of Patent: Sep. 4, 2018

(54) STATUS MONITORING FOR BOXED WIRELESS DEVICE

(71) Applicant: Clover Network, Inc., Sunnyvale, CA (US)

(72) Inventors: Narayanan Gopalakrishnan, Newark, CA (US); James Castillo, Mountain House, CA (US); Nagalakshmi Rajagopal, Sunnyvale, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 15/819,139

(22) Filed: Nov. 21, 2017

(51) Int. Cl.
| | |
|---|---|
| *G06Q 20/20* | (2012.01) |
| *G06Q 20/38* | (2012.01) |
| *G06F 1/14* | (2006.01) |
| *H04B 5/00* | (2006.01) |
| *G06Q 20/32* | (2012.01) |
| *G06Q 20/34* | (2012.01) |
| *H04L 9/14* | (2006.01) |

(52) U.S. Cl.
CPC ............ *G06Q 20/206* (2013.01); *G06F 1/14* (2013.01); *G06Q 20/3829* (2013.01); *G06Q 20/3278* (2013.01); *G06Q 20/341* (2013.01); *G06Q 2220/00* (2013.01); *H04B 5/0031* (2013.01); *H04L 9/14* (2013.01); *H04L 2209/56* (2013.01); *H04L 2209/80* (2013.01)

(58) Field of Classification Search
CPC ............ G06Q 20/206; G06Q 20/3829; G06Q 20/341; G06Q 20/3278; G06Q 2220/00; G06F 1/14; H04L 9/14; H04L 2209/56; H04L 2209/80; H04B 5/0031
USPC .......................................................... 235/383
See application file for complete search history.

(56) References Cited

U.S. PATENT DOCUMENTS

| | | | | |
|---|---|---|---|---|
| 7,551,098 | B1* | 6/2009 | Chock | G08B 29/08 174/50 |
| 8,295,811 | B1* | 10/2012 | Gailloux | H04M 3/42144 455/411 |
| 9,635,127 | B2* | 4/2017 | Tucker | H04L 67/303 |
| 2005/0073406 | A1 | 4/2005 | Easley | |
| 2009/0295548 | A1 | 12/2009 | Ronkka | |

(Continued)

OTHER PUBLICATIONS

J. Zhang, et al., Smart Container Security—the E-seal with RFID Technology, TransNav International Journal, vol. 2, No, 1, Mar. 2008.

(Continued)

*Primary Examiner* — Claude J Brown
(74) *Attorney, Agent, or Firm* — Daylight Law, P.C.

(57) ABSTRACT

Methods and systems for determining the status of a packaged device are disclosed. The device can include a secure microcontroller, a battery, a memory storing a status code, and an NFC antenna located in the device and communicatively coupled to the secure microcontroller. A set of instructions are stored on the secure microcontroller to write the status code to the memory. The status code is accessible from outside the sealed package via the antenna. The device could also be a POS device with instructions to process payment information received on the antenna. The apparatus could also include a power routing switch. Power could then be provided from the antenna to the battery via the switch output when the switch is in a conductive state.

55 Claims, 8 Drawing Sheets

(56) References Cited

U.S. PATENT DOCUMENTS

| | | | |
|---|---|---|---|
| 2012/0118956 A1* | 5/2012 | Lamba | G06Q 20/3224 |
| | | | 235/437 |
| 2013/0084800 A1 | 4/2013 | Troberg | |
| 2013/0109323 A1* | 5/2013 | Ruutu | H04B 5/0031 |
| | | | 455/68 |
| 2013/0139230 A1* | 5/2013 | Koh | G06F 21/44 |
| | | | 726/5 |
| 2015/0017914 A1* | 1/2015 | Dua | G06F 17/30058 |
| | | | 455/41.1 |
| 2015/0126110 A1 | 5/2015 | Ashley | |
| 2015/0281873 A1 | 10/2015 | Ojala | |
| 2016/0321895 A1* | 11/2016 | Al Marzouqi | G08B 13/2451 |
| 2017/0194820 A1* | 7/2017 | Hall | H02J 50/90 |

OTHER PUBLICATIONS

NXP, NFC for Embedded Applications, Company Brochure, NXP Semiconductors N.V., Aug. 2014.

* cited by examiner

800

STATUS MONITORING FOR BOXED WIRELESS DEVICE

BACKGROUND

Manufactured devices are tested prior to being placed in their final packaging. Once testing is complete, the devices are packaged and are then placed into inventory before being shipped to final consumers. Those final consumers expect the packaging to remain sealed until they choose to open their new devices. Sealed packaging provides benefit in terms of security in that it makes tampering with a device in an undetectable manner more difficult. Unfortunately, the same sealed package that keeps the device safe prevents access to the device for purposes of quality control and status monitoring. Since a device may stay in inventory for an appreciable amount of time, there is the chance that the state of the device may alter after it is finally tested and packaged, but before it is delivered to a consumer. This creates the potential for a manufacturer to not only disappoint their customer through the delivery of a defective unit, but to also needlessly incur the cost of shipping that defective unit both out to the customer and back to the manufacturer for assessment, repair, and repackaging.

Various issues can arise with packaged devices prior to being shipped out form inventory. Devices that have internal batteries for core system functions such as time keeping can run out of batteries. Furthermore, in certain secure applications, some systems will purge sensitive data or shut down if the internal battery fails. For example, point of sale (POS) devices can store cryptographic keys in a secure volatile memory powered by an internal battery, and loss of battery power will trigger destruction of those keys, thereby rendering the device unable to process transactions. Sensitive applications can also sometimes involve devices with internal tamper detection circuits which will erase sensitive data if a tamper is detected. If a tamper is detected in a packaged device, via false alarm or otherwise, the fact that the device is no longer functional should be reported to the manufacturer before it is released for shipment to a consumer.

SUMMARY

Methods and systems for determining the status of a packaged device are disclosed. The status of the device could be checked using an external reader that is in communication with a status monitoring and reporting system on the device via an antenna on the packaged device. The antenna could be an inherent portion of the device that is utilized to process information when the device is unpackaged and deployed in its usual operating condition. The packaged device could include an internal battery to power the status monitoring and reporting system. The battery could be charged by electromagnetic signals received from an external reader or a specialized wireless charging device. Those electromagnetic signals could be provided by the same antenna that is utilized by the status monitoring and reporting system.

The packaged device could be a component of a point of sale (POS) system. The antenna could be a near field communication (NFC) antenna and the information processed when the component is deployed in its usual operating condition could be the information necessary for the POS component to conduct an NFC payments protocol. The information could be payment information such as a credit card number. The packaged device could include a secure microcontroller used to encrypt the payment information using payment keys stored on a secure memory. The status information could include a tamper indicator, a battery life indicator, and other status information. The packaged device could include a battery used to power the secure memory and a tamper monitoring system. The same antenna can be used for: receiving payment information when the device is deployed, transmitting status information when the device is packaged, receiving control information to switch between modes, and charging the battery.

In certain approaches an apparatus includes a sealed package, a device located inside the sealed package, a secure microcontroller located in the device, and a battery located in the device. The battery is ohmically coupled to the secure microcontroller. The apparatus also includes an electrically programmable memory in the device storing a status code for the device, and an NFC antenna located in the device and communicatively coupled to the secure microcontroller. The device could include a set of instructions stored on the secure microcontroller to write the status code to the memory. The status code is accessible from outside the sealed package via the NFC antenna. The device could be a POS device and the secure microcontroller could include a set of instructions to process payment information received from the NFC antenna. The apparatus could also include a power routing switch having a switch input and a switch output. The switch input could be ohmically coupled to the NFC antenna when the switch is in a conductive state and a nonconductive state. Power could then be provided from the NFC antenna to the battery via the switch output when the switch is in the conductive state.

In other approaches a method includes programming a POS device to process payment information received via an antenna located in the POS device and packaging the POS device in a sealed package. The method also includes writing, while the POS device is in the sealed package, a status code for the POS device to an electrically programmable memory in the POS device using a secure microcontroller in the POS device. The method also includes interrogating, while the POS device is in the sealed package, the POS device using the antenna and an external reader, to obtain the status code.

DETAILED DESCRIPTION

Certain methods and systems disclosed herein assist in filtering defective devices from a manufacturing and distribution line after they have been packaged, but before they are shipped to a consumer. The example of a point of sale (POS) device is used throughout this disclosure, but the methods and systems disclosed herein are broadly applicable to packaged electronic devices generally. Certain methods and systems disclosed herein are applicable to packaged electronic devices having antennas for communication when the device is deployed in its usual operating condition. The antenna of such a device can be referred to as an inherent antenna because the device could not conduct its intended regular operational functions without the antenna. In approaches disclosed herein, an inherent antenna is used to provide status information for identifying defective devices. The status information can be provided by a status monitoring and reporting system. The status monitoring system can be powered by a battery. Certain methods and systems disclosed herein charge such a battery while the device is packaged. In certain methods and systems disclosed herein the same antenna that is used to check the status of the device is also used to charge the battery for the status monitoring and reporting system.

Figure 1:
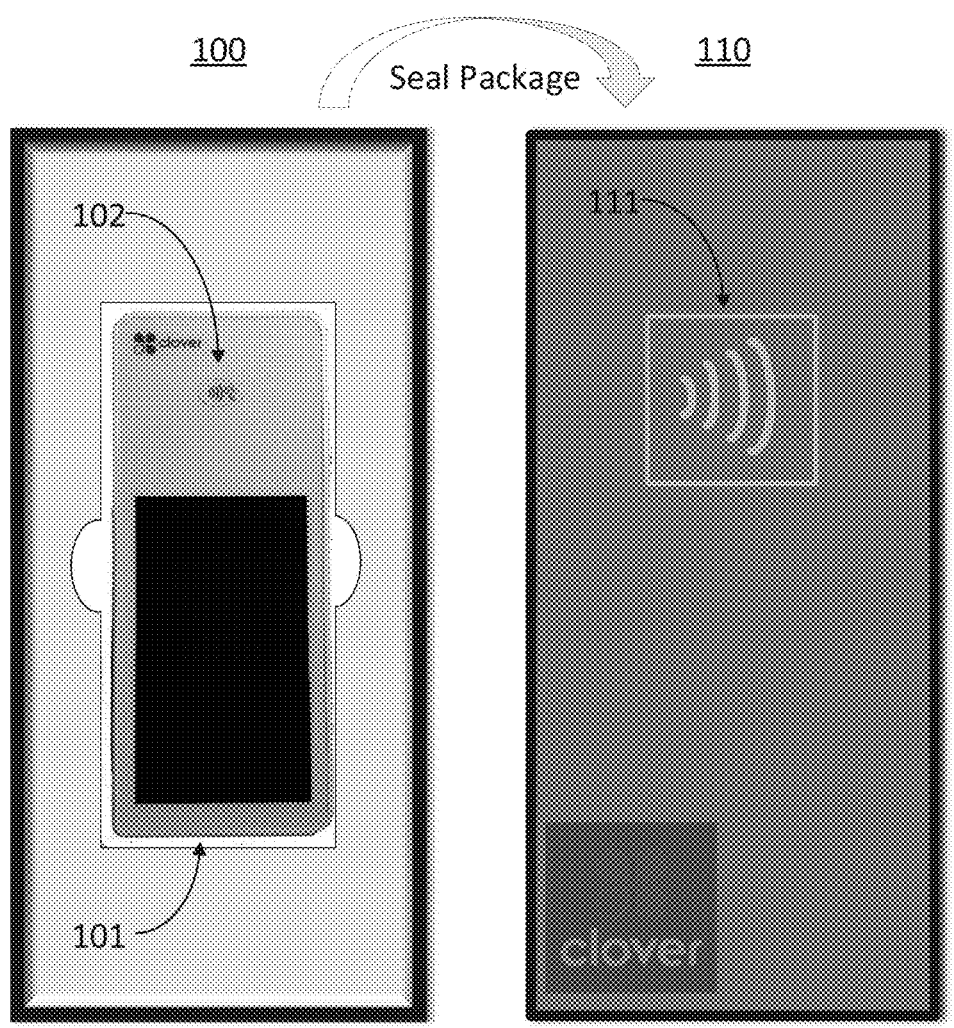
FIG. 1 is an illustration of a package and point of sale (POS) device configured to provide status information via an inherent antenna when the POS device is sealed in the package.

FIG. 1 illustrates a package in two states. In state 100, the package is unsealed and the contents of the box, including electronic device 101, are directly accessible. In closed state 110, the package is sealed and the contents of the box are not accessible. The transition from state 100 to state 110 can occur in a manufacturing and distribution facility as one of the last steps conducted on the device before it is stored as inventory. Device 101 is a POS device that can process payment information received via a near field communication (NFC) protocol when NFC enabled devices are placed in proximity to communication point 102.

An antenna located within device 101 is located beneath the exterior of the device and close to communication point 102. The exterior of the device is formed of radio frequency permeable material such that communication can be conducted through the exterior material of the device. Furthermore, when the device is sealed in sealed state 110, the packaging material is selected and configured such that communication can still be conducted through the packaging material. The packaging material could be radio frequency permeable material such as plastic, paperboard, or corrugated fiberboard. As such, it is possible to communicate with the device through the packaging when the device is packaged, and an additional antenna is not required to facilitate this communication. The package could also include an interrogation target 111 to mark the location on the package where communication can be conducted. This feature could be beneficial if multiple device types moved through the same facility and automated image processing techniques were used to align readers with the packages for interrogation, or to assist third parties unfamiliar with the interior of a package to know where to target a reader on the package.

Before device 101 is shipped from a manufacturing or distribution facility, a reader can be placed in proximity to interrogation target 111. The reader can check the status of the device in accordance with approaches disclosed herein to determine if the device is clear for shipping to a consumer. For example, the reader could determine if the battery of the device was out of power or low, if a tamper sensor on the device had been tripped, read a serial number of the device, determine the age of the device with reference to a real time persistent clock embedded in the device, and conduct any other kind of status investigation facilitated by the internals of the device in accordance with this disclosure. If the NFC reader determined that the internal battery of the device was low on power, the NFC antenna could also be used to provide charge to the battery wirelessly.

In certain approaches, status reporting for the sealed device in the package is achieved using a status monitoring microcontroller. The microcontroller, or at least a portion of the microcontroller, can be battery powered. The status monitoring microcontroller can monitor the status of the device and write codes representing that status to a memory that is accessible via the antenna on the sealed device. The antenna can be any kind of radio antenna such as a dipole, monopole, strip line, loop, or coil antenna. The wireless signal transmitted using the antenna when the device is deployed in its usual operating condition can be any wireless signal such as a WiFi, Bluetooth, or NFC signal. The status code can be accessible from outside the sealed package via the antenna.

The antenna can be controlled by a wireless front end microcontroller or any discrete antenna controller. The front-end microcontroller can obtain the code from an electrically programmable memory by reading from the memory. In certain approaches, the electrically programmable memory will be a nonvolatile discrete device on the same circuit board as the front-end microcontroller. In certain approaches, the status monitoring microcontroller can write status codes to the nonvolatile memory while it has the power to do so, and those codes will remain in the nonvolatile memory and accessible via the antenna regardless of whether the status monitoring microcontroller loses power or is otherwise cut off from the system. In certain approaches, the wireless signal that is used to communicate with the antenna is also able to provide power to energize the front-end microcontroller and allow it to read the code from the memory. In other approaches, the memory can be a nonvolatile memory on the status monitoring microcontroller itself. In these approaches, the status monitoring microcontroller can be temporarily energized to enable the front-end microcontroller to read status codes from the nonvolatile memory. For example, the wireless signal that is used to communicate with the antenna could be used to energize the nonvolatile memory and the input/output circuits of the status monitoring microcontroller to read status directly from the microcontroller. As another example, a power routing configuration for a battery could be temporarily altered to energize the nonvolatile memory and the input/output circuits of the status monitoring microcontroller to read status directly from the microcontroller.

In a POS device, or other secure application, the status monitoring microcontroller could be a secure microcontroller. The secure microcontroller could be powered by a battery or include subsystems that are continuously powered by a battery. For example, the secure microcontroller could include battery backed logic that serves as a tamper sensor, and that received status information for other key parameters as well such as battery life. The battery backed logic could be resistor transistor logic or some other form of low-power logic. The tamper sensors could respond to and potentially power a physical tamper mesh that seals in secure elements of the device in a tamper resistant shell. The battery backed logic could also provide codes indicative of other kinds of status information. The battery backed logic could also be responsible for writing the status codes for the device to the status memory whether the status memory is on the secure microcontroller or in a separate external memory. The secure microcontroller could include instructions to write the status codes to memory such as an internal memory or an external memory. The secure microcontroller could also include a battery backed volatile memory storing cryptographic keys for the POS device. The cryptographic keys could be kept in the secure microcontroller and be used to encrypt payment information received via the antenna to process payments. The cryptographic keys could be stored in a volatile memory that was powered by the battery. The battery backed logic could be tasked with removing power to that volatile memory in case a tamper was detected. The POS device could also store instructions for processing payment information received via antenna 203 using the cryptographic keys. The secure microcontroller could also include another set of subsystems, such as the input/output and nonvolatile memories described in the previous paragraph, that could be temporarily powered by an alternative power source such as the energy from the antenna or a second battery.

Figure 2:
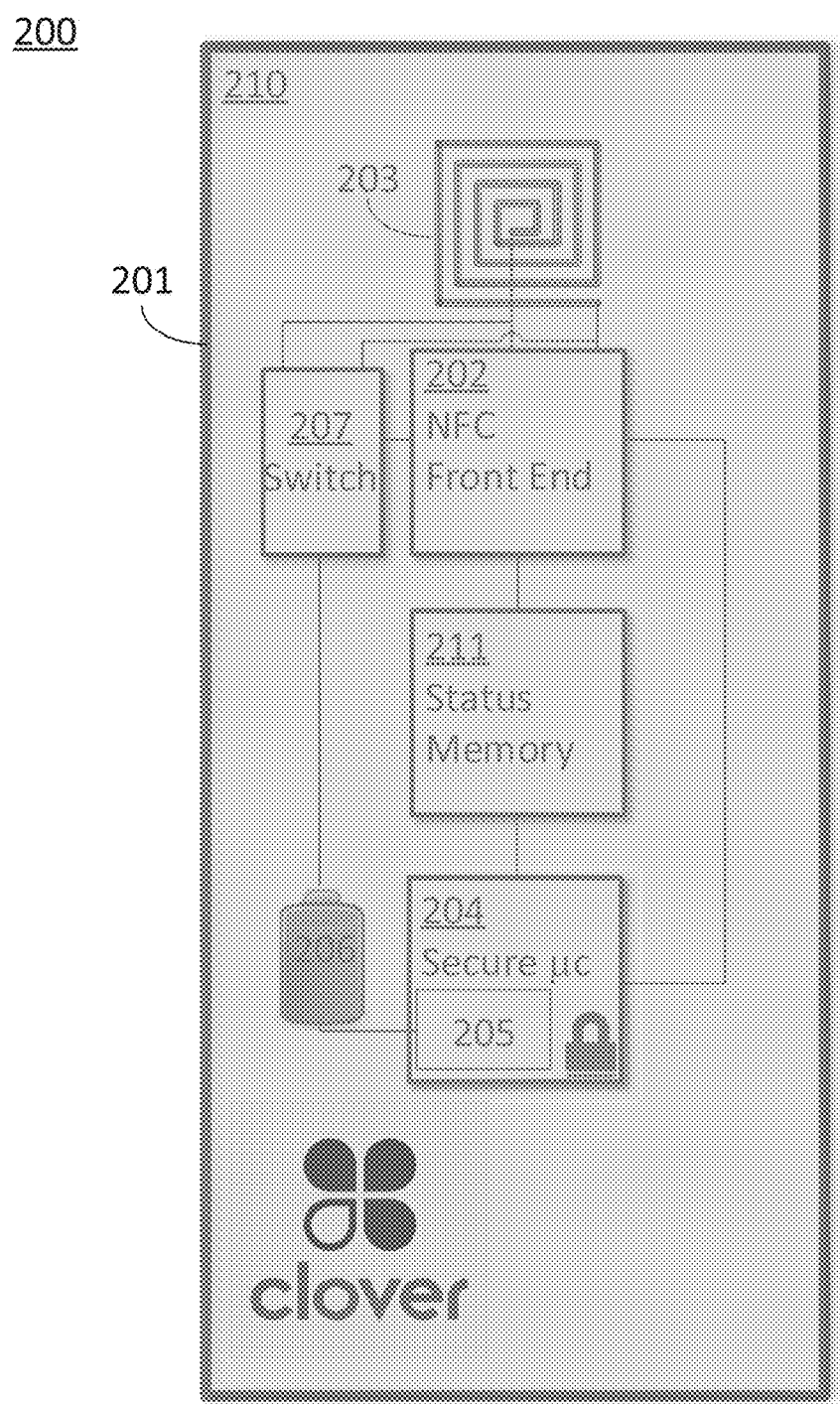
FIG. 2 is a block diagram of a status reporting and monitoring system for a POS device in a sealed package with a discrete electrically programmable status memory.
Figure 3:
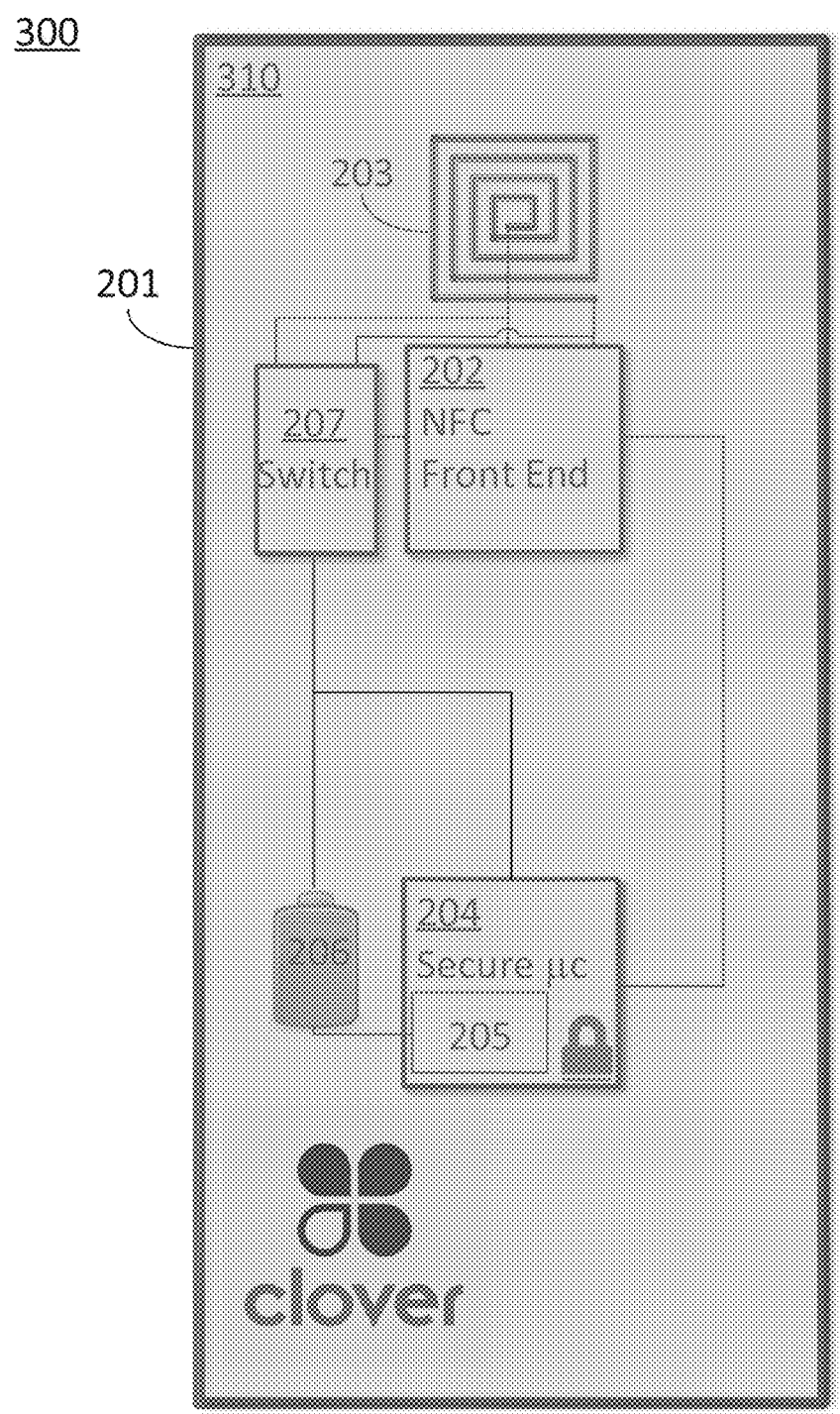
FIG. 3 is a block diagram of a status reporting and monitoring system for a POS device in a sealed package.

FIGS. 2 and 3 are two block diagrams 200 and 300 that illustrate apparatuses capable of providing status information for a packaged wireless device through an inherent antenna. The devices include many similar components with like components being referred to using the same reference numeral in both figures. The illustrated apparatuses include a sealed package 201, a block diagram of key components of a status monitoring and reporting system (210 and 310), an NFC front end 202, an antenna 203, and a secure microcontroller 204. In both diagrams, the antenna 203 is communicatively coupled to the secure microcontroller 204 via NFC front end 202. The status monitoring and reporting system can be located entirely within the POS device. In these diagrams, secure microcontroller 204 serves as the status monitoring microcontroller for the system. In accordance with certain aspects of this disclosure, codes produced by secure microcontroller 204 will be accessible on antenna 203 via an external reader. The devices represented by block diagrams 200 and 300 differ in terms of how that code is made available on the antenna as described in more detail in the next paragraph. In both block diagrams, the secure microcontroller 204 also includes battery backed logic 205 powered by battery 206. Battery backed logic 205 is used to control a tamper sensor and the provisioning of power to a volatile memory storing cryptographic keys for the POS device.

The two figures differ in terms of how the status information is generated and stored. In block diagram 210, the device includes a discrete nonvolatile status memory 211. The discrete nonvolatile status memory 211 can be a discrete nonvolatile memory located on the same printed circuit board as secure microcontroller 204 and NFC front end 202. Status codes can be written to discrete nonvolatile status memory 211 using battery backed logic 205. The status codes can then be read from discrete nonvolatile status memory 211 using energy provided via antenna 203. An external reader can provide energy to the antenna as part of the process of reading from the device. This energy can be used to power NFC front end 202 and nonvolatile status memory 211. As a result, the status of the device can be read even if the battery has failed. The nonvolatile status memory can be a discrete EEPROM chip. In block diagram 310, the device does not require discrete nonvolatile status memory 211. Instead, power is provided from the antenna to power the input/output of the secure microcontroller 204 and a nonvolatile memory on secure microcontroller 204 such that the status code can be read directly from the secure microcontroller. This approach can involve power routing switch 207 to change its state long enough for the power to be routed directly from the antenna to the secure microcontroller (at least long enough for the code to be provided to NFC front end 202). Subsequently, the power routing switch can again change its state and the code can be read from NFC font end 202.

In certain approaches, the packaged electronic device will include a battery located in the device, such as battery 206. The battery can be a lithium ion or coin battery. The battery can be rechargeable. The battery can be charged by power received on the inherent antenna. The battery can power a volatile memory for storing sensitive data for the electronic device. The battery can be located in the device and ohmically coupled to the status monitoring microcontroller. As illustrated, battery 206 is ohmically coupled to secure microcontroller 204 for purposes of powering battery backed logic 205 and potentially also powering the volatile memory that stores the cryptographic keys for the POS device. The battery can receive power from the antenna via a power routing switch. The power routing switch can provide an alternative path for power to flow from the antenna besides via NFC front end 202. As illustrated, power routing switch 207 has a switch input connected to antenna 203 and a switch output that provides power to battery 206. The illustrated power routing switch 207 could include a bridge rectifier to convert the received power into a direct current signal for charging the battery. The state of power routing switch 207 could be affected by a signal received from NFC front end 202 over a GPIO interface or an equivalent interface. As illustrated, the line connecting NFC front end 202 and power routing switch 207 is a GPIO interface. The connection could be via a circuit trace on a printed circuit board. The power routing switch could be switched between a conductive state and a nonconductive state via a signal received over that connection. In either state, the switch input of power routing switch 207 is ohmically coupled to antenna 203. However, in the nonconductive state, the alternative path would not interfere with the communication of NFC front end 202 and antenna 203 because the path would be an open circuit. In the conductive state, power could be routed to battery 206 via the switch output of power routing switch 207 to the detriment of communication capabilities with antenna 203. However, as NFC front end 202 is in control of the state of power routing switch 207 it can be able to configure itself to ignore signals on its connection to the antenna while power routing switch 207 is in a conductive state.

Certain benefits accrue to approaches that are in accordance with those illustrated in FIGS. 2 and 3. In particular, the use of secure microcontroller 204 as the status monitoring system is beneficial because the secure process is already designed to play a critical role in the event of a tampered status condition, and therefore is already well suited to play a role in a change of status of the device via the execution of logic. Therefore, the additional requirement of storing a status code can be readily facilitated without major modification to an existing design for the secure microcontroller of a POS device. Furthermore, the use of the same antenna to conduct payment transactions, provide status information for a packaged device, and to allow for charging of the internal battery of the POS device provides additional functionality to the system with little increase in hardware requirements.

Figure 4:
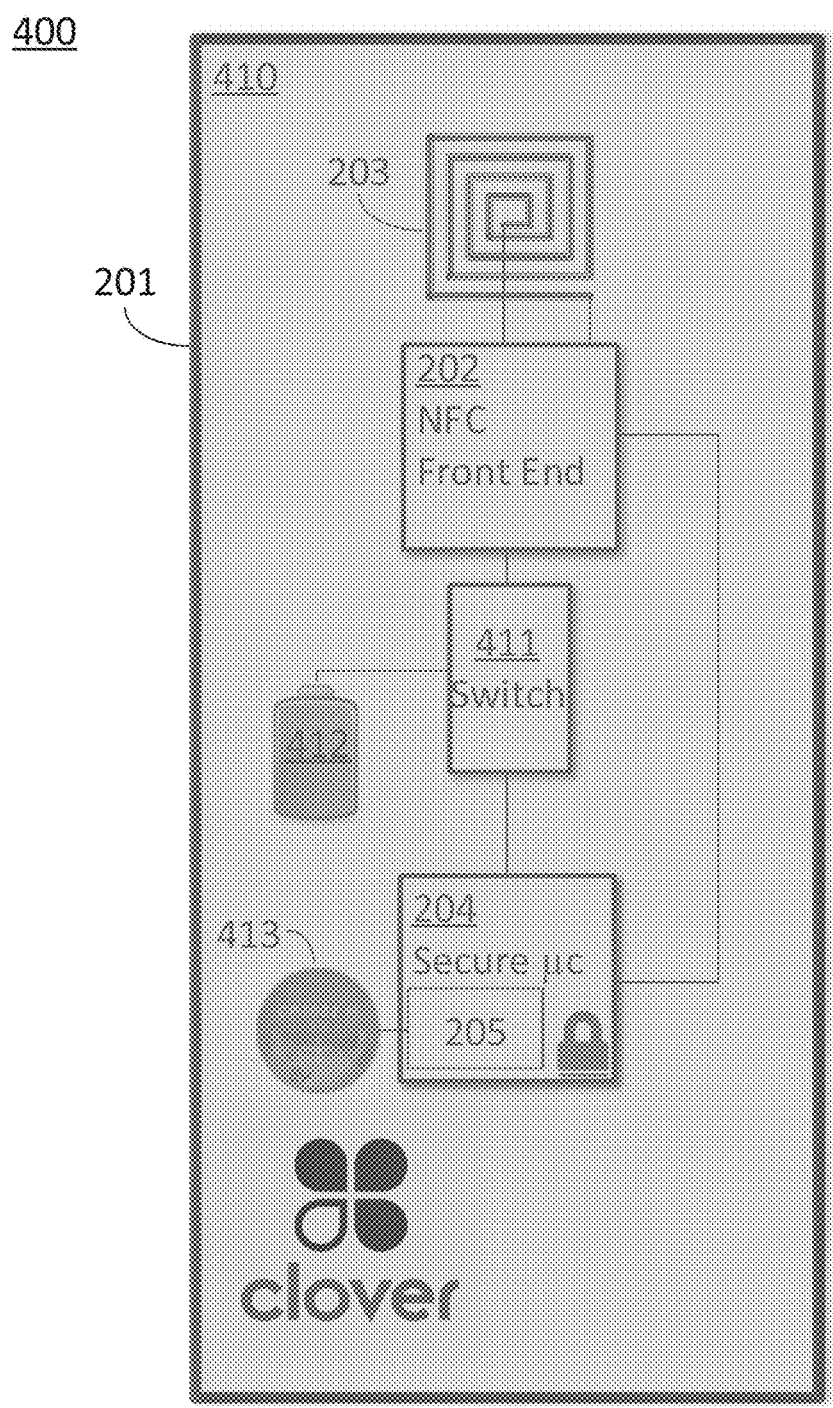
FIG. 4 is a block diagram of a status reporting and monitoring system for a POS device in a sealed package where a battery is used to power subsystems of the secure microcontroller during a read status operation.

FIG. 4 includes a block diagrams 400 that illustrate apparatuses capable of providing status information for a packaged wireless device through an inherent antenna. The devices include many similar components with like components being referred to using the same reference numerals as in FIGS. 2-3. FIG. 4 represents a variant of the approach in FIG. 3 in that the secure microcontroller is powered temporarily by an alternative power source than a battery when the status code is read from the device. In the approach in FIG. 3, that alternative power source is energy received via the antenna. In the approach in FIG. 4, that alternative power source is a second battery.

The apparatus illustrated in FIG. 4 includes a sealed package 201, a block diagram of key components of a status monitoring and reporting system 410, an NFC front end 202, an antenna 203, and a secure microcontroller 204. Antenna 203 is communicatively coupled to the secure microcontroller 204 via NFC front end 202. The status monitoring and reporting system can be located entirely within the POS device. In these diagrams, secure microcontroller 204 serves as the status monitoring microcontroller for the system. In accordance with certain aspects of this disclosure, codes produced by secure microcontroller 204 will be accessible on antenna 203 via an external reader. The secure microcontroller 204 also includes battery backed logic 205 powered by battery 413. Battery 413 has taken the place of battery 206 for purposes of illustration, but battery 413 can exhibit all of the features described with reference to batter 206 above.

FIG. 4 illustrates two power sources for secure microcontroller 204 in the same way that FIG. 3 illustrates the potential for power to be provided to the secure microcontroller 204 from battery 206 or antenna 203. However, in FIG. 4, secure microcontroller 204 can receive power either from battery 413 or from a second battery 412. Battery 413 can be used to continuously power a set of subsystems on secure microcontroller 204 such as battery backed logic 205 and a volatile memory storing sensitive information on secure microcontroller 204. As in FIGS. 2 and 3, battery 413 could be charged via the antenna if its charge was low, although the associated circuitry is not shown in FIG. 4. Battery 412 can be used to temporarily power a set of subsystems on secure microcontroller 204 such as the input/output circuits of the microcontroller or a nonvolatile memory on secure microcontroller storing a status code. Specifically, the battery could be used to power the read circuitry of the nonvolatile memory in order to obtain the status code. The nonvolatile memory could be similar to the nonvolatile memory mentioned with respect to FIG. 3 such that the status code could be read directly from the secure microcontroller. This approach can involve power routing switch 411 which changes its state from nonconductive to conductive in response to a control signal received from NFC front end 202. The input of switch 411 is ohmically coupled to second battery 412 when switch 411 is in the conductive state and when switch 411 is in the nonconductive state. While switch 411 is in a conductive state, secure microcontroller 204 is ohmically connected to second battery 412. Second battery 412 could be a main battery for the device such as a lithium ion rechargeable battery that provides power to the device when it is switched on. Battery 413 could be a backup battery that is used to continuously provide power to select circuitry on the device. NFC front end 202 can read the status code from secure microcontroller 204 while power is being supplied to secure microcontroller 204. Subsequently, power routing switch 411 can again change its state to disconnect battery 412 from secure microcontroller 204. Both changes in conductivity state for switch 411 can be controller by commands received from antenna 203 which in turn cause NFC front end 202 to generate a command to switch the state of switch 411. Alternatively, the command to switch states can originate in NFC front end 202 when NFC front end 202 has determined that the status code has been accessed from secure microcontroller 204.

The status codes that are provided by the status monitoring system can contain information regarding various aspects of the system. For example, the status codes could be Boolean values that indicate if a device has been tampered with, if a device has a low battery, if a device has aged beyond a desired point, or if the device is generally functional. However, the status codes could also include more detailed information such as a value indicative of the battery level for an onboard battery such as batteries 206, 413, and 412. The battery level value could be generated using a sensor on the device that could physically measure the battery using a volt meter or some other sensor. The value could also be generated using an estimate of the life of the battery and a real time persistent timer built into the device. The output of such a timer could also be used as a status code to indicate the age of the device. Various aspects of the system and its performance could be combined into a single code and decoded using knowledge of the encoding system. Alternatively, numerous codes could be stored at different addresses in memory that could be independently reviewed or verified by an external reader. The use of a counter to estimate battery life is an appealing approach for POS applications because such devices are more likely to already include a very sensitive and accurate clock in the form of a real-time counter that is initiated when the device was manufactured.

The status codes could be provided from the status monitoring microcontroller to an external nonvolatile memory using any low power technology. For example, the battery backed logic 205 could by RTL logic that sends a pattern via I²C or SPI commands to an EEPROM chip. The codes could be provided by the status monitoring microcontroller on demand from a command received by the NFC front end. Alternatively, the codes could be provided periodically in accordance with a predetermined schedule and as implemented using the built-in counter on the device. For example, the status could be written once every day. The same low power technology could be used to store the code in a battery powered volatile memory or a nonvolatile memory on the status monitoring microcontroller. In situations in which the status codes were stored in volatile memory, the volatile memory could include a known default state that the memory reverted to when power was cut, and the default state could be used to determine that the device had either run out of battery or had been subject to a defect or tamper. In response to detecting the default state, an external reader could attempt to charge the battery and provide a command to check the status of the device once sufficient charge had been provided.

Figure 5:
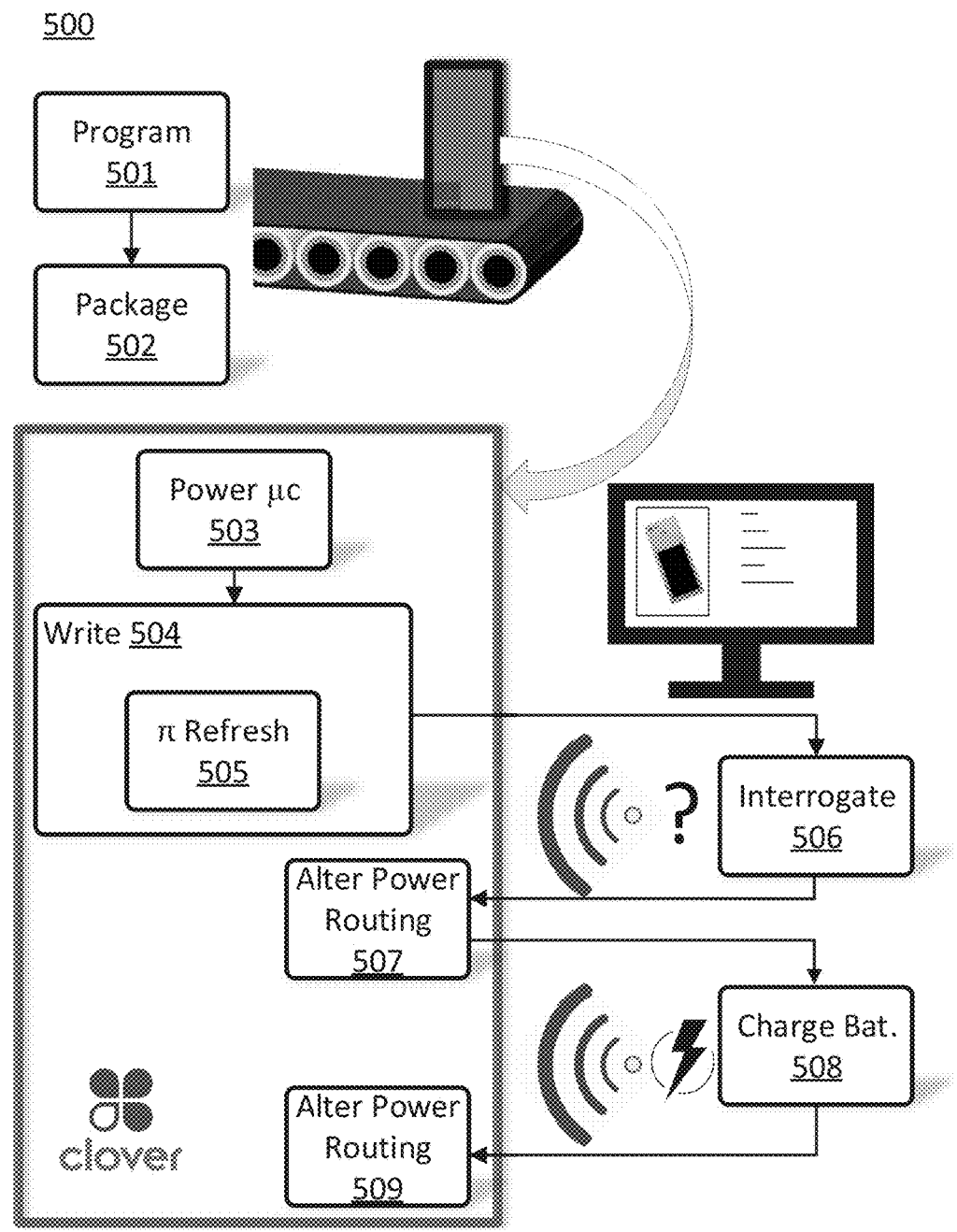
FIG. 5 is a flow chart for a set of methods for monitoring and determining the status of a device in a sealed package during manufacturing and distribution.

FIG. 5 includes a flow chart 500 for a set of methods that can be conducted by a manufacturing and distribution line deploying devices in accordance with the disclosure provided above. Flow chart 500 begins with a step 501 of programming a POS device to process payment information received via an antenna located in the POS device. This step is conducted while the device is manufactured and includes installing instructions in the POS device in read only memory or firmware on the device. Upon being so programmed, the device can be tested in a final testing stage of the manufacturing line to assure the device is functional before it is packaged. The flow chart continues with a step 502 of packaging the POS device in a sealed package. The device is then kept secure and has a level of tamper protection afforded to it by being placed in a sealed package. However, standard testing such as via a USB bus or other wired interface is no longer possible because the device is in a sealed package.

Flow chart 500 continues with a set of steps for checking the status of the POS device and potentially charging the battery of the POS device while it is in the sealed package. The flow chart continues with a step 503 of powering a status monitoring microcontroller using a battery located in the POS device. The entire microcontroller may not be powered in this step, and in some cases only a low power segment of the microcontroller will be powered such as battery backed RTL logic and a volatile memory. This step can be executed continuously throughout the execution of steps 504 and 505, and could also be executed through the execution of step 506. In step 504, a status code for the POS device is written to electrically programmable memory in the POS device using the status monitoring microcontroller in the POS device. The electrically programmable memory could be inside the status monitoring microcontroller, or external to the status monitoring microcontroller. The memory could be nonvolatile memory. The memory could be powered by the battery while it is being written to. As mentioned previously, the status monitoring microcontroller could be a secure microcontroller of the POS device with an internal status monitoring circuit. Step 504 could be executed by the internal status monitoring circuit. Step 504 could be executed while the internal status monitoring circuit was being provided with power from an internal battery in the POS device. Step 505 involves periodically refreshing the status code in the electrically programmable memory. This step could be conducted by a status monitoring microcontroller. The refreshing could be conducted according to a predetermined schedule that was programmed into the status monitoring microcontroller via the execution of instructions stored on the status monitoring microcontroller. The period could be set to 24 hours or any other reasonable refresh period given a desire to keep the status code relevant while at the same time preserving battery power.

Flow chart 500 continues with a set of steps that can be conducted by an external diagnostic system either at the same manufacturing and distribution facility that conducted steps 501 and 502, or at a downstream facility, including in the consumer's receiving facility. Step 506 involves interrogating, while the POS device is in the sealed package, the POS device using the internal antenna and an external reader, to obtain the status code. If the antenna is an NFC antenna, the external reader could be an NFC reader. The status code could be received by the external reader from the electrically programmable memory such as status memory 211 or an internal memory on secure microcontroller 204. The same external reader, or a specialized charging device, could then be used to charge a battery of the POS device. Flow chart 500 continues with a step 507 of altering a power routing state of a power routing switch on the POS device. The power routing switch could be power routing switch 207. The command to change the power routing switch could be provided via the external reader. If the antenna is an NFC antenna, the command could be provided via an NFC packet. Step 507-509 could be conducted independently of the steps in the rest of flow chart 500, or they could be conducted after a status code indicating that an internal battery of the POS device had low power was detected in step 506. Flow chart 500 then continues with a step 508 of charging the battery of the POS device using an internal antenna and the external reader. This step could also be conducted by a specialized wireless charging device to charge the device through the package. The interrogation of the device and the provisioning of the command to change the routing of the switch state could be conducted via a different antenna than the antenna that is used to provide power to the internal antenna on the device.

Figure 6:
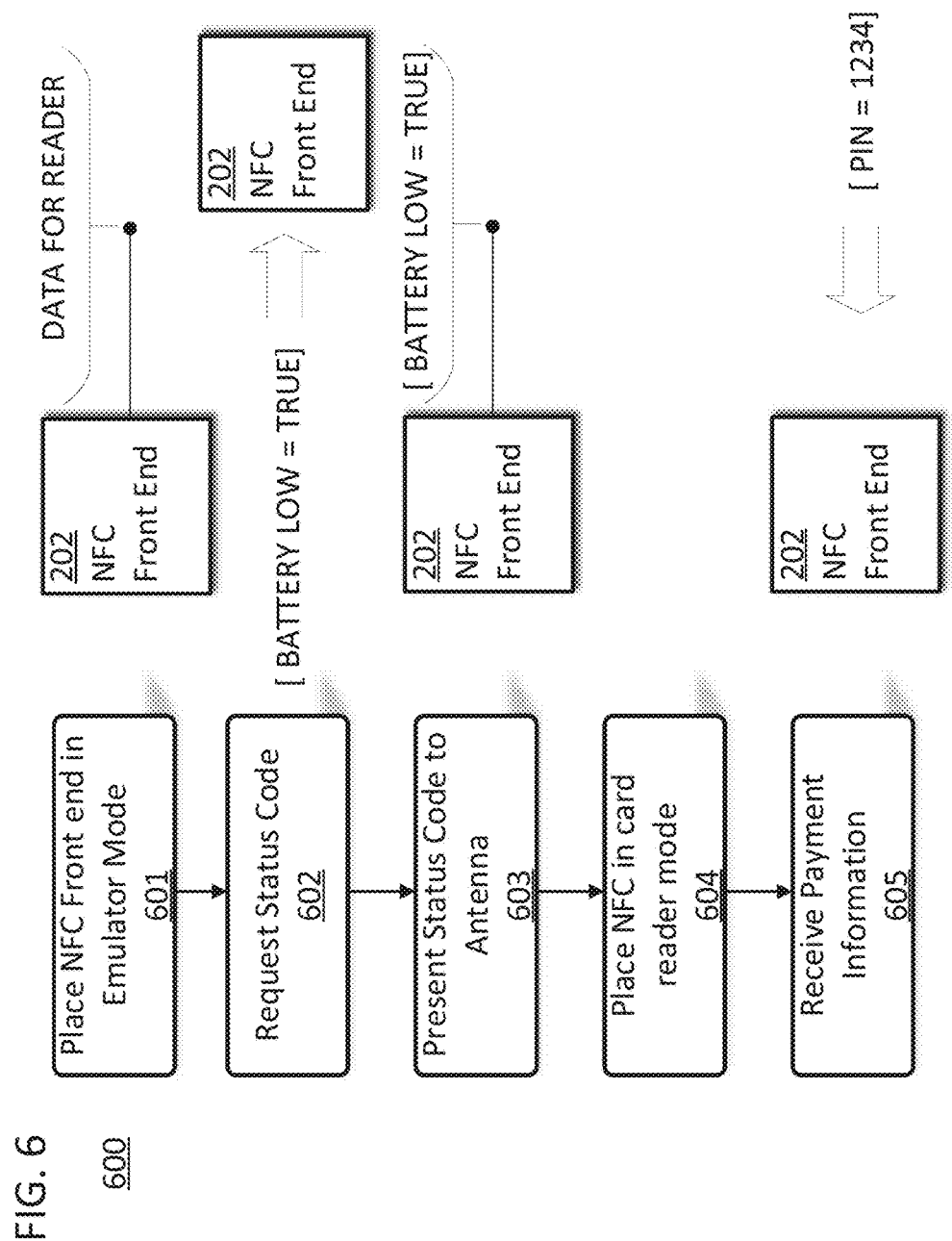
FIG. 6 is a flow chart for a set of methods for utilizing a single antenna for a device's standard operating mode and status reporting when the device is in a sealed package.

Flow chart 600 in FIG. 6 provides an explanation of how the same antenna can be used as the inherent antenna for the wireless device when the device is deployed in its regular operating mode and to provide the status of the device when it is in a sealed package. Flow chart 600 is described with specific reference to a POS device that includes an inherent NFC antenna for processing payments, but similar approaches can be applied to other devices in which the inherent antenna is used to provide status information from a sealed package. Flow chart 600 begins with a step 601 in which an NFC front-end chip located in the POS device is placed in emulator mode. A secure microcontroller of the POS device could be in communication with the antenna via the NFC front-end chip while the NFC front-end chip is in a NFC card reader mode, and switching into the emulator mode could isolate the secure microcontroller from communicating via the antenna. The NFC front end could be placed in the card emulator mode and present data located in a buffer on the NFC front end to any reader that interrogated the NFC front end via the antenna.

An NFC front end could be placed in emulator mode in accordance with step 601 in numerous ways. Some NFC stacks allow an NFC device to alternate between reader and emulator modes based on a command received on the antenna while the device is in either mode, rendering the execution of this step a simple matter of receiving a command to switch to emulator mode. However, alternative NFC stacks, or alternative approaches in which the antenna is not an NFC antenna, could instead execute step 601 automatically whenever the device was powered down. These approaches would likewise automatically execute step 604, discussed in more detail below, when the device was powered up.

Flow chart 600 continues with a step 602 of requesting, while the NFC front end chip is in emulator mode, the status code from the secure microcontroller using the NFC front end chip. This step could involve the NFC Front end receiving power from the NFC antenna to conduct this action. The step could involve the NFC Front end providing a command to the secure microcontroller to read a status code from a memory on the secure microcontroller. Such an approach could also require the secure microcontroller to receive power from the antenna or a second battery to power the input/output of the secure microcontroller as described above. As such, this step could also be preceded by the NFC Front end chip sending a command to alter the power routing state of a switch to provide power to the status monitoring system for purposes of powering circuitry associated with reading a status code using the antenna or a second battery. Alternatively, step 602 could involve the NFC front end chip accessing a memory external to the secure microcontroller in which the status code was stored such as discrete status memory 211. The NFC front end chip could store instructions to execute step 602. In certain approaches, step 602 will be executed prior to the NFC front end entering into emulator mode such that the code is already available on the NFC Front end chip when it is requested from an external antenna.

Flow chart 600 continues with a step 603 of presenting, while the NFC Front End chip is in the card emulator mode, the status code to the antenna using the NFC Front End chip. The status code would then be readily available for being read by an external reader. An external system could include a cross reference of what the status codes meant regarding the condition of the device. This step could involve storing the status code in a buffer or set of registers on the NFC Front end chip that could be read from by an external reader interrogating the antenna. Steps 602 and 603 could be repeated periodically to assure that the currently presented status code reflected the status of the device. The predetermined period could be programmed into the NFC Front End Chip.

Flow chart 600 continues with a step 604 of placing the NFC card in a card reader mode and a step 605 of receiving payment information on the antenna. These steps could be conducted when the device was taken out of the sealed package and deployed in its usual operating conditions. The NFC front end chip could store instructions to provide the received payment information to the secure microcontroller when the NFC front end chip is in the card reader mode. In certain approaches, the POS device will also include an applications processor that instantiates an operating system for the POS device, but the payment information received on the antenna will be routed directly to the secure microcontroller such that the received payment information is continuously isolated in a secure environment through the entire course of being available to the POS device. In specific approaches, an internal battery provides power to the secure microcontroller, but is not ohmically coupled to the applications processor and does not provide power to the applications processor when the operating system is instantiated. As mentioned above, step 604 could be executed automatically whenever the device was powered up. In specific approaches, step 604 will be executed when the secure microcontroller is informed that the applications processor has instantiated the operating system for the POS device.

Figure 7:
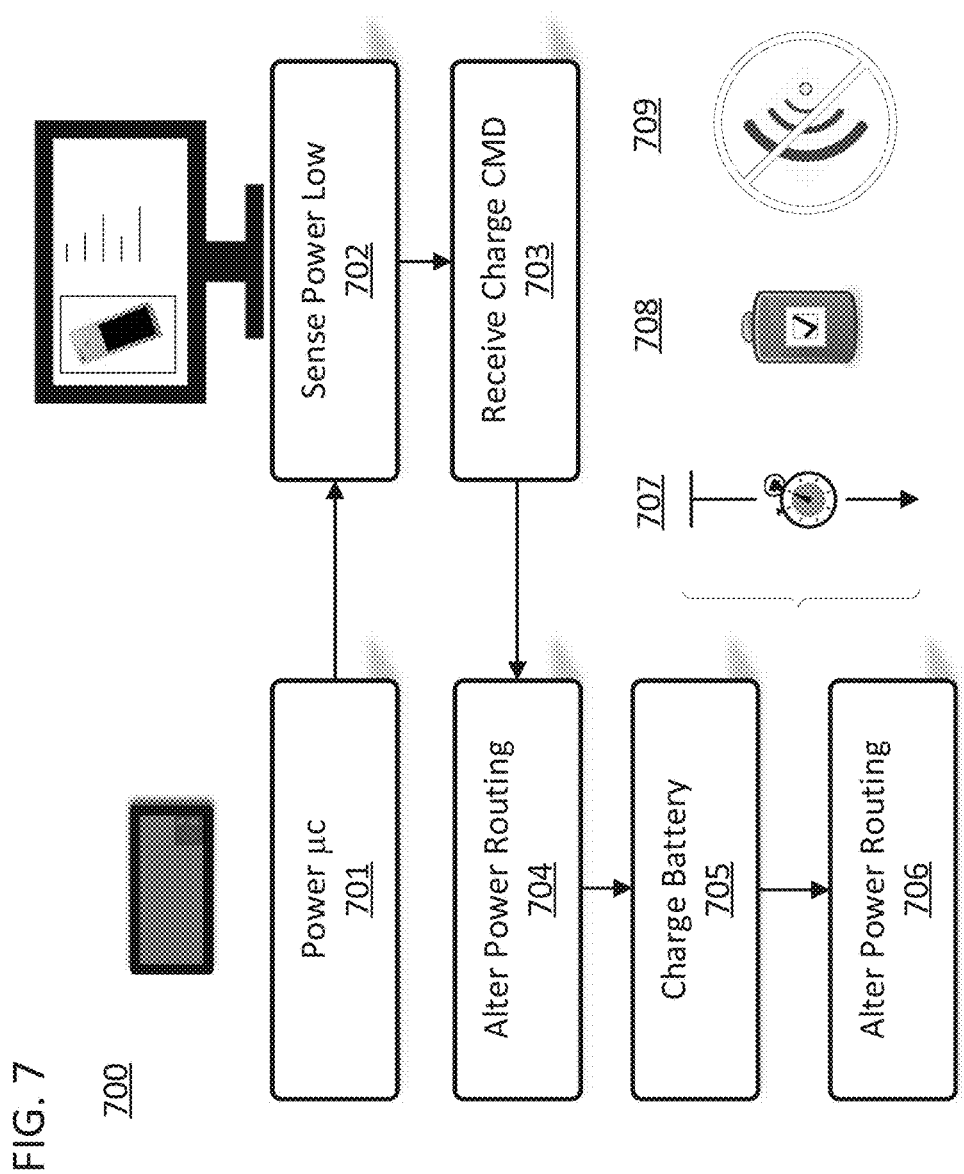
FIG. 7 is a flow chart for a set of methods for utilizing a single antenna for a device's status reporting and wireless charging when the device is in a sealed package.

Flow chart 700 in FIG. 7 provides an explanation of how the antenna used to provide the status of the device when it is in a sealed package can also be used to receive charge for an internal battery on the device. The handoff between the two modes is complicated by the fact that both modes need to occur while the device is in the sealed package so there is no way to use the clear dividing line of the device being turned off and located in the sealed package as the dividing line between when the two modes should occur. The example of an NFC front end chip controlling the state of a switch is provided for the sake of explanation, but the disclosed method is equally applicable to a device with any form of antenna and any front-endassociated with the transmission of signals via that antenna.

In step 701, a secure microcontroller is powered by a battery in the POS device. The battery can power a subset of the circuitry on the microcontroller such as a status monitoring circuit and a volatile memory for storing secure information. In step 702, an external reader can sense the status of the POS device and determine that the power is low by reading a status code from the device. The NFC antenna on the POS device can be in an emulator mode. In response to determining that the power is low, or entirely out, the external reader can provide a command to the device to prepare to receive a charge. The NFC antenna can store instructions to receive the command from the antenna while the NFC front end is in card emulator mode as certain NFC stacks allow for the receipt of commands while a device is operating it card emulator mode. The command can be received in the form of an NFC packet. In response to receiving the charge command, the device can configure itself to receive charge from an external source via the same antenna that was used to provide the status code.

Flow chart 700 continues with a step 704 of altering a state of a power routing switch located in the POS device from a nonconductive state to a conductive state in response to the command received in step 703. The switch input can be ohmically coupled to the NFC antenna when the switch is in the conductive state and the nonconductive state while power is provided from the antenna to the battery via the switch output when the switch is in the conductive state. The switch could be a power routing switch such as power routing switch 207. The instructions for executing step 704 could be stored in an NFC front end chip on the device. The step could involve sending a command to the power routing switch via a GPIO interface. The signal could be transmitted digitally. Alternatively, the signal could be an analog signal delivered directly to the gate of a power routing transistor to alter the conductivity of the transistor. Flow chart 700 continues with a step 705 of charging the battery using the antenna and power routed through the power routing switch.

Step 705 will continue until the NFC front end alters the state of the switch in step 706. The manner in which the NFC antenna conducts switch 706 can be a basic reversal of the process utilized in step 704. However, the duration of step 705 will depend on the specific implementation of the device. The NFC front end can store instructions to execute step 706, and terminate step 705, upon receipt of a termination command. The termination command can be generated upon the expiration of a predetermined time period 707, receipt of a battery full signal 708, or a loss of connection signal 709. The loss of connection signal can be provided by a sensor connected to the charging terminal of the battery or the antenna itself. Upon loss of energy, the sensor will determine that a connection has been lost and deliver the loss of connection signal to the NFC front end. The predetermined time period can be generated based on the status signal (e.g., if the status signal indicates that the battery is at 75%, a time period sufficient to charge the battery 25% can be generated and stored as the predetermined time period). The battery full signal can be generated by a volt meter or other sensor connected to the battery.

Figure 8:
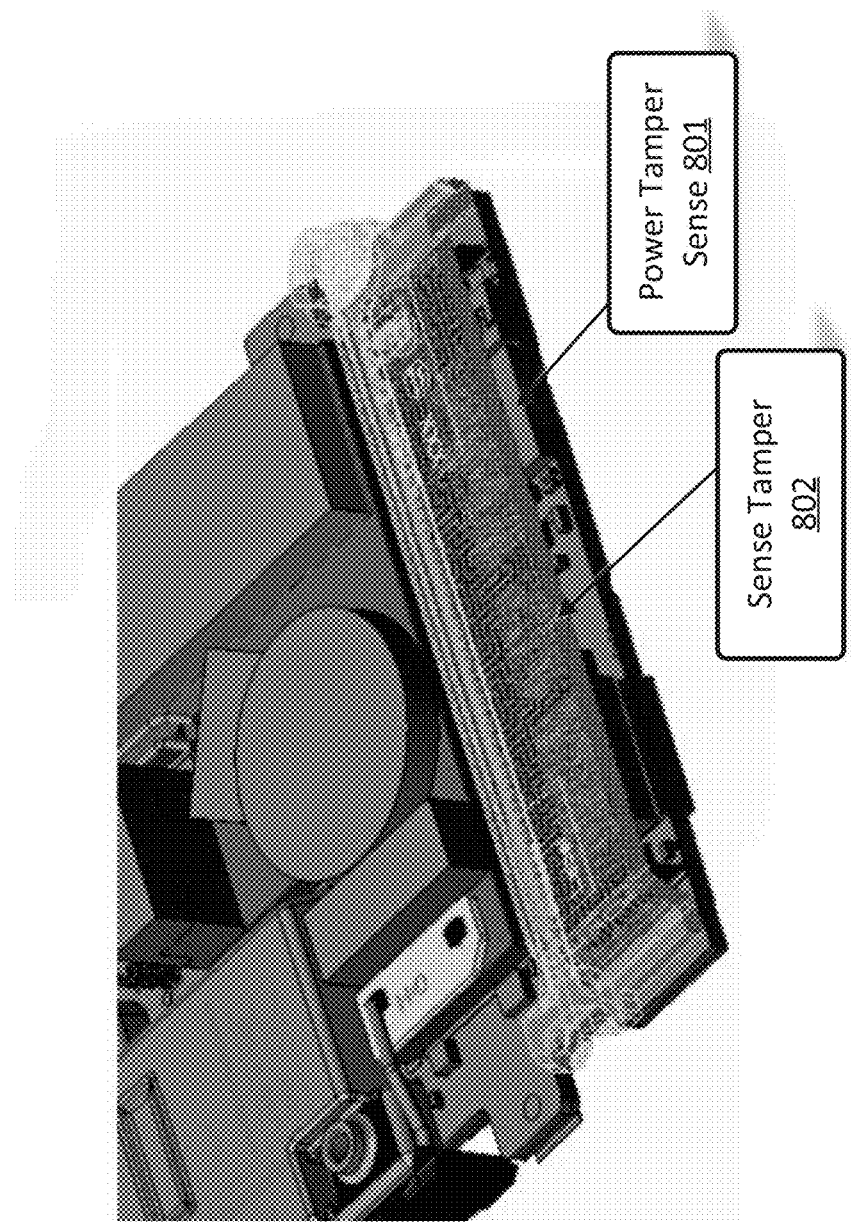
FIG. 8 is an annotated CAD diagram of a main board for a POS device with a tamper mesh and a tamper sensor located in a secure microcontroller.

CAD diagram 800 in FIG. 8 illustrates a main board of a POS device that includes a tamper monitoring system. The device includes a tamper mesh 802 and a tamper sensor 801 communicatively coupled to tamper mesh 802. The tamper sensor can be powered by an internal battery on the device, such as battery 206. The tamper sensor can be located on a secure microcontroller such as secure microcontroller 204. The tamper sensor can include logic to remove power to a volatile memory of the secure microcontroller when a tamper is detected by the tamper mesh, and to write a status code to an electrically programmable memory such as status memory 211 or a status memory on the secure microcontroller. The tamper monitoring system includes a secure mesh that surrounds a secure microcontroller. The tamper monitoring system is configured to erase cryptographic keys stored in battery backed SRAM located in the secure microcontroller when a tamper is detected. The tamper monitoring system sends out a signal from the secure microcontroller onto the tamper mesh and monitors a return signal from the tamper mesh. If at any point the return signal differs from an expected signal, the tamper sensor in the secure microcontroller will disconnect the battery backed SRAM from power to thereby destroy the cryptographic keys. As a result, the illustrated device requires constant power in order for the overall POS system to remain functional—without the cryptographic keys, the device will be unable to process payments.

In accordance with this disclosure, the tamper event can be treated as one of the status events reported by the status monitoring and reporting system, and the status code described above can indicate a tamper. In CAD diagram 800, the illustrated device can execute a step of powering the tamper sensor on the secure microcontroller. The tamper sensor can use this power to send a code on an I²C or SPI bus to the status memory described above. The code can be sent at the same time the tamper sensor cuts power to a nonvolatile memory storing sensitive information for the device. In some approaches described above, the information can be read from a nonvolatile status memory without unpackaging the device by applying an NFC field on the antenna. As a result, using the approaches disclosed, a tamper event can be reported out from a packaged device. In certain approaches, the status can be read even if the power of the device has run out.

Certain methods and systems disclosed herein alleviate the problem of having to filter defective devices from a manufacturing and distribution line after they have been packaged, but before they are shipped to an end user. As a result, shipping costs can be saved by not shipping defective or tampered devices to an end user. It is also better from a customer service perspective to avoid having to have customers receive and ship back defective or tampered units even if the shipping cost is covered.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure where generally directed to point of sale devices and near field communication antennas, the same approaches could be utilized for any electronic device and any form of wireless antennas. These and other modifications and variations to the present invention may be practiced by those skilled in the art, without departing from the scope of the present invention, which is more particularly set forth in the appended claims.

What is claimed is:

1. An apparatus comprising:
    a sealed package;
    a point of sale device located inside the sealed package;
    a secure microcontroller located in the point of sale device;
    a battery: (i) located in the point of sale device; and (ii) ohmically coupled to the secure microcontroller;
    an electrically programmable memory in the point of sale device storing a status code for the point of sale device;
    an NFC antenna located in the point of sale device and communicatively coupled to the secure microcontroller;
    a status monitoring circuit located in the secure microcontroller;
    a set of instructions stored on the secure microcontroller for execution by the status monitoring circuit to periodically refresh the status code in the electrically programmable memory;
    an NFC front end chip;
    a set of instructions stored on the secure microcontroller to:
        process payment information received from the NFC antenna; and
        write the status code to the electrically programmable memory;
    wherein the status code is accessible from outside the sealed package via the NFC antenna;
    wherein the electrically programmable memory is volatile;
    wherein the secure microcontroller is communicatively coupled to the NFC antenna via the NFC front end chip; and
    wherein the status monitoring circuit and the NFC front end chip are both configured to receive power via the NFC antenna when the status code is accessed from outside the sealed package.

2. The apparatus of claim 1, further comprising:
    a power routing switch having a switch input and a switch output;
    wherein the switch input is ohmically coupled to the NFC antenna when the switch is in a conductive state and a nonconductive state; and
    wherein power is provided from the NFC antenna to the battery via the switch output when the switch is in a conductive state.

3. The apparatus of claim 1, further comprising:
    a tamper mesh;
    a tamper sensor: (i) communicatively coupled to the tamper mesh; (ii) powered by the battery; and (iii) located in the secure microcontroller;
    wherein the tamper sensor includes logic to remove power to a volatile memory of the secure microcontroller when a tamper is detected by the tamper mesh; and
    wherein a default state of the electrically programmable memory indicates a tamper.

4. The apparatus of claim 1, further comprising:
    a status monitoring circuit located in the secure microcontroller; and
    a set of instructions stored on the secure microcontroller for execution by the status monitoring circuit to periodically refresh the status code in the electrically programmable memory.

5. The apparatus of claim 1, further comprising:
    a real time clock implemented in the secure microcontroller; and
    wherein the status code is generated and refreshed using the real time clock.

6. The apparatus of claim 1,
    wherein the NFC front end chip stores instructions to: (i) request the status code from the secure microcontroller and present the status code to the NFC antenna when the NFC front end chip is in a card emulator mode; and (ii) provide the payment information to the secure microcontroller when the NFC front end chip is in a card reader mode.

7. The apparatus of claim 1, further comprising:
    a power routing switch having a switch input and a switch output;
    wherein the NFC front end chip stores instructions to: (i) receive a command from the NFC antenna when the NFC front end chip is in a card emulator mode; (ii) alter a state of the switch from a nonconductive state to a conductive state upon receipt of the command; (iii)

alter the state of the switch from the conductive state to the nonconductive state upon receipt of a termination command;

wherein the switch input is ohmically coupled to the NFC antenna when the switch is in the conductive state and the nonconductive state; and wherein power is provided from the NFC antenna to the battery via the switch output when the switch is in the conductive state.

8. The apparatus of claim 7, wherein:
the termination command is generated by the NFC front end chip upon one of: (i) an expiration of a predetermined time period; (ii) receipt of a battery full signal; and (iii) receipt of a loss of connection signal.

9. The apparatus of claim 1, further comprising:
a second battery;
a power routing switch having a switch input and a switch output;
wherein the NFC front end chip stores instructions to: (i) receive a command from the NFC antenna when the NFC front end chip is in a card emulator mode; (ii) alter a state of the switch from a nonconductive state to a conductive state upon receipt of the command; (iii) alter the state of the switch from the conductive state to the nonconductive state upon receipt of a termination command;
wherein the switch input is ohmically coupled to the second battery when the switch is in the conductive state and the nonconductive state; and
wherein power is provided from the second battery to the secure microcontroller when the switch is in the conductive state.

10. The apparatus of claim 9, wherein:
the termination command is received by the NFC antenna.

11. The apparatus of claim 1, further comprising:
an applications processor;
wherein the applications processor stores instructions to instantiate an operating system for the point of sale device; and
wherein the battery is not ohmically coupled to the applications processor and does not provide power to the applications processor when the operating system is instantiated.

12. An apparatus comprising:
a sealed package;
a device located inside the sealed package;
a microcontroller located in the device;
a battery: (i) located in the device; and (ii) ohmically coupled to the microcontroller;
an electrically programmable memory in the device storing a status code for the device; and
an NFC antenna located in the device and communicatively coupled to the microcontroller;
a power routing switch having a switch input and a switch output;
an NFC front end chip;
wherein the switch input is ohmically coupled to the NFC antenna when the switch is in a conductive state and a nonconductive state;
wherein power is provided from the NFC antenna to the battery via the switch output when the switch is in the conductive state;
wherein the NFC front end chip stores instructions to: (i) monitor for a command from the NFC antenna when the NFC front end chip is in a card emulator mode; (ii) alter a state of the switch from the nonconductive state to the conductive state upon receipt of the command; (iii) alter the state of the switch from the conductive state to the nonconductive state upon receipt of a termination command; and
wherein the status code is accessible from outside the sealed package via the NFC antenna.

13. The apparatus of claim 12, further comprising:
a set of instructions stored on the microcontroller to:
process payment information received from the NFC antenna; and
write the status code to the electrically programmable memory;
wherein the device is a point of sale device; and
wherein the microcontroller is a secure microcontroller.

14. The apparatus of claim 1:
wherein the secure microcontroller is communicatively coupled to the NFC antenna via the NFC front end chip; and
wherein the NFC front end chip stores instructions to: (i) request the status code from the secure microcontroller and present the status code to the NFC antenna when the NFC front end chip is in a card emulator mode; and (ii) provide the payment information to the secure microcontroller when the NFC front end chip is in a card reader mode.

15. The apparatus of claim 13, further comprising:
an applications processor;
wherein the applications processor stores instructions to instantiate an operating system for the point of sale device; and
wherein the battery is not ohmically coupled to the applications processor and does not provide power to the applications processor when the operating system is instantiated.

16. The apparatus of claim 12, further comprising:
a tamper mesh;
a tamper sensor: (i) communicatively coupled to the tamper mesh; (ii) powered by the battery; and (iii) located in the microcontroller;
wherein the tamper sensor includes logic to: (i) remove power to a volatile memory of the microcontroller when a tamper is detected by the tamper mesh; and (ii) to write the status code to the electrically programmable memory;
wherein the status code indicates a tamper; and
wherein the electrically programmable memory is non-volatile.

17. The apparatus of claim 12, further comprising:
a status monitoring circuit located in the microcontroller; and
a set of instructions stored on the microcontroller for execution by the status monitoring circuit to periodically refresh the status code in the electrically programmable memory;
wherein the electrically programmable memory is non-volatile.

18. The apparatus of claim 12, further comprising:
a real time clock implemented in the microcontroller; and
wherein the status code is generated and refreshed using the real time clock.

19. The apparatus of claim 12, further comprising:
a status monitoring circuit located in the microcontroller;
a set of instructions stored on the microcontroller for execution by the status monitoring circuit to periodically refresh the status code in the electrically programmable memory;
an NFC front end chip;
wherein the electrically programmable memory is volatile;
wherein the secure microcontroller is communicatively coupled to the NFC antenna via the NFC front end chip; and
wherein the status monitoring circuit and the NFC front end chip are both configured to receive power via the NFC antenna when the status code is accessed from outside the sealed package.

20. The apparatus of claim 12, wherein:
the termination command is generated by the NFC front end chip upon one of: (i) an expiration of a predetermined time period; (ii) receipt of a battery full signal; and
(iii) receipt of a loss of connection signal.

21. A method comprising:
programming a point of sale device to process payment information received via an antenna located in the point of sale device;
packaging the point of sale device in a sealed package;
writing, while the point of sale device is in the sealed package, a status code for the point of sale device to an electrically programmable memory in the point of sale device using a secure microcontroller in the point of sale device;
interrogating, while the point of sale device is in the sealed package, the point of sale device using the antenna and an external reader, to obtain the status code;
placing an NFC front end chip in a card emulator mode, wherein the NFC front end chip is in the point of sale device;
requesting, while the NFC front end chip is in the card emulator mode, the status code from the secure microcontroller using the NFC front end chip;
presenting, while the NFC front end chip is in a card emulator mode, the status code to the antenna using the NFC front end chip;
placing the NFC front end chip in a card reader mode; and
receiving, while the NFC front end chip is in the card reader mode, the payment information from the antenna using the NFC front end chip.

22. The method of claim 21, further comprising:
powering the secure microcontroller using a battery located in the point of sale device; and
charging the battery of the point of sale device using the antenna and the external reader.

23. The method of claim 21, further comprising:
receiving a command from the external reader using the antenna;
altering a state of a power routing switch located in the point of sale device from a nonconductive state to a conductive state in response to the command;
altering the state of the power routing switch from the conductive state to the nonconductive state upon one of: (i) an expiration of a predetermined time period; (ii) receipt of a battery full signal; and (iii) receipt of a loss of connection signal.

24. The method of claim 21, further comprising:
periodically refreshing the status code in the electrically programmable memory using the secure microcontroller.

25. The method of claim 21, further comprising:
detecting a tamper using tamper sensor logic and a tamper mesh in the point of sale device; and
removing power to a volatile memory of the secure microcontroller in response to the tamper;
wherein the writing of the status code is conducted in response to the tamper;
wherein the electrically programmable memory is nonvolatile; and
wherein the volatile memory stores keys to process the payment information.

26. An apparatus comprising:
a sealed package;
a point of sale device located inside the sealed package;
a secure microcontroller located in the point of sale device;
a battery: (i) located in the point of sale device; and (ii) ohmically coupled to the secure microcontroller;
an electrically programmable memory in the point of sale device storing a status code for the point of sale device;
an NFC antenna located in the point of sale device and communicatively coupled to the secure microcontroller;
an NFC front end chip;
a set of instructions stored on the secure microcontroller to:
process payment information received from the NFC antenna; and
write the status code to the electrically programmable memory;
wherein the status code is accessible from outside the sealed package via the NFC antenna;
wherein the secure microcontroller is communicatively coupled to the NFC antenna via the NFC front end chip; and
wherein the NFC front end chip stores instructions to: (i) request the status code from the secure microcontroller and present the status code to the NFC antenna when the NFC front end chip is in a card emulator mode; and (ii) provide the payment information to the secure microcontroller when the NFC front end chip is in a card reader mode.

27. The apparatus of claim 26, further comprising:
a power routing switch having a switch input and a switch output;
wherein the switch input is ohmically coupled to the NFC antenna when the switch is in a conductive state and a nonconductive state; and
wherein power is provided from the NFC antenna to the battery via the switch output when the switch is in a conductive state.

28. The apparatus of claim 26, further comprising:
a tamper mesh;
a tamper sensor: (i) communicatively coupled to the tamper mesh; (ii) powered by the battery; and (iii) located in the secure microcontroller;
wherein the tamper sensor includes logic to: (i) remove power to a volatile memory of the secure microcontroller when a tamper is detected by the tamper mesh; and (ii) to write the status code to the electrically programmable memory;
wherein the status code indicates a tamper; and
wherein the electrically programmable memory is nonvolatile.

29. The apparatus of claim 26, further comprising:
a status monitoring circuit located in the secure microcontroller; and a set of instructions stored on the secure microcontroller for execution by the status monitoring circuit to periodically refresh the status code in the electrically programmable memory;
wherein the electrically programmable memory is nonvolatile.

30. The apparatus of claim 26, further comprising:
a real time clock implemented in the secure microcontroller; and
wherein the status code is generated and refreshed using the real time clock.

31. The apparatus of claim 26, further comprising:
a power routing switch having a switch input and a switch output;
wherein the NFC front end chip stores instructions to: (i) receive a command from the NFC antenna when the NFC front end chip is in the card emulator mode; (ii) alter a state of the switch from a nonconductive state to a conductive state upon receipt of the command; (iii) alter the state of the switch from the conductive state to the nonconductive state upon receipt of a termination command;
wherein the switch input is ohmically coupled to the NFC antenna when the switch is in the conductive state and the nonconductive state; and
wherein power is provided from the NFC antenna to the battery via the switch output when the switch is in the conductive state.

32. The apparatus of claim 31, further comprising:
the termination command is generated by the NFC front end chip upon one of: (i) an expiration of a predetermined time period; (ii) receipt of a battery full signal; and (iii) receipt of a loss of connection signal.

33. The apparatus of claim 26, further comprising:
a second battery;
a power routing switch having a switch input and a switch output;
wherein the NFC front end chip stores instructions to: (i) receive a command from the NFC antenna when the NFC front end chip is in the card emulator mode; (ii) alter a state of the switch from a nonconductive state to a conductive state upon receipt of the command; (iii) alter the state of the switch from the conductive state to the nonconductive state upon receipt of a termination command;
wherein the switch input is ohmically coupled to the second battery when the switch is in the conductive state and the nonconductive state; and
wherein power is provided from the second battery to the secure microcontroller when the switch is in the conductive state.

34. The apparatus of claim 33, wherein:
the termination command is received by the NFC antenna.

35. The apparatus of claim 26, further comprising:
an applications processor;
wherein the applications processor stores instructions to instantiate an operating system for the point of sale device; and
wherein the battery is not ohmically coupled to the applications processor and does not provide power to the applications processor when the operating system is instantiated.

36. An apparatus comprising:
a sealed package;
a point of sale device located inside the sealed package;
a secure microcontroller located in the point of sale device;
a battery: (i) located in the point of sale device; and (ii) ohmically coupled to the secure microcontroller;
an electrically programmable memory in the point of sale device storing a status code for the point of sale device;
an NFC antenna located in the point of sale device and communicatively coupled to the secure microcontroller;
an NFC front end chip;
a power routing switch having a switch input and a switch output;
a set of instructions stored on the secure microcontroller to:
process payment information received from the NFC antenna; and
write the status code to the electrically programmable memory;
wherein the status code is accessible from outside the sealed package via the NFC antenna;
wherein the NFC front end chip stores instructions to: (i) receive a command from the NFC antenna when the NFC front end chip is in a card emulator mode; (ii) alter a state of the switch from a nonconductive state to a conductive state upon receipt of the command; (iii) alter the state of the switch from the conductive state to the nonconductive state upon receipt of a termination command;
wherein the switch input is ohmically coupled to the NFC antenna when the switch is in the conductive state and the nonconductive state; and
wherein power is provided from the NFC antenna to the battery via the switch output when the switch is in the conductive state.

37. The apparatus of claim 36, wherein:
the termination command is generated by the NFC front end chip upon one of: (i) an expiration of a predetermined time period; (ii) receipt of a battery full signal; and (iii) receipt of a loss of connection signal.

38. The apparatus of claim 36, further comprising:
a tamper mesh;
a tamper sensor: (i) communicatively coupled to the tamper mesh; (ii) powered by the battery; and (iii) located in the secure microcontroller;
wherein the tamper sensor includes logic to: (i) remove power to a volatile memory of the secure microcontroller when a tamper is detected by the tamper mesh; and (ii) to write the status code to the electrically programmable memory;
wherein the status code indicates a tamper; and
wherein the electrically programmable memory is nonvolatile.

39. The apparatus of claim 36, further comprising:
a status monitoring circuit located in the secure microcontroller; and
a set of instructions stored on the secure microcontroller for execution by the status monitoring circuit to periodically refresh the status code in the electrically programmable memory;
wherein the electrically programmable memory is nonvolatile.

40. The apparatus of claim 36, further comprising:
a real time clock implemented in the secure microcontroller; and
wherein the status code is generated and refreshed using the real time clock.

41. The apparatus of claim 36, further comprising:
an applications processor;
wherein the applications processor stores instructions to instantiate an operating system for the point of sale device; and
wherein the battery is not ohmically coupled to the applications processor and does not provide power to the applications processor when the operating system is instantiated.

42. An apparatus comprising:
a sealed package;
a point of sale device located inside the sealed package;
a secure microcontroller located in the point of sale device;
a first battery: (i) located in the point of sale device; and (ii) ohmically coupled to the secure microcontroller;
an electrically programmable memory in the point of sale device storing a status code for the point of sale device;
an NFC antenna located in the point of sale device and communicatively coupled to the secure microcontroller;
an NFC front end chip;
a second battery;
a power routing switch having a switch input and a switch output;
a set of instructions stored on the secure microcontroller to:
process payment information received from the NFC antenna; and
write the status code to the electrically programmable memory;
wherein the status code is accessible from outside the sealed package via the NFC antenna;
wherein the NFC front end chip stores instructions to: (i) receive a command from the NFC antenna when the NFC front end chip is in a card emulator mode; (ii) alter a state of the switch from a nonconductive state to a conductive state upon receipt of the command; (iii) alter the state of the switch from the conductive state to the nonconductive state upon receipt of a termination command;
wherein the switch input is ohmically coupled to the second battery when the switch is in the conductive state and the nonconductive state; and
wherein power is provided from the second battery to the secure microcontroller when the switch is in the conductive state.

43. The apparatus of claim 42, wherein:
the termination command is received by the NFC antenna.

44. The apparatus of claim 42, further comprising:
a tamper mesh;
a tamper sensor: (i) communicatively coupled to the tamper mesh; (ii) powered by the first battery; and (iii) located in the secure microcontroller;
wherein the tamper sensor includes logic to: (i) remove power to a volatile memory of the secure microcontroller when a tamper is detected by the tamper mesh; and (ii) to write the status code to the electrically programmable memory;
wherein the status code indicates a tamper; and
wherein the electrically programmable memory is nonvolatile.

45. The apparatus of claim 42, further comprising:
a status monitoring circuit located in the secure microcontroller; and
a set of instructions stored on the secure microcontroller for execution by the status monitoring circuit to periodically refresh the status code in the electrically programmable memory;
wherein the electrically programmable memory is nonvolatile.

46. The apparatus of claim 42 further comprising:
a real time clock implemented in the secure microcontroller; and
wherein the status code is generated and refreshed using the real time clock.

47. The apparatus of claim 42, further comprising:
an applications processor;
wherein the applications processor stores instructions to instantiate an operating system for the point of sale device; and
wherein the first battery is not ohmically coupled to the applications processor and do not provide power to the applications processor when the operating system is instantiated.

48. An apparatus comprising:
a sealed package;
a device located inside the sealed package;
a microcontroller located in the device;
a battery: (i) located in the device; and (ii) ohmically coupled to the microcontroller;
an electrically programmable memory in the device storing a status code for the device; and
an NFC antenna located in the device and communicatively coupled to the microcontroller;
a power routing switch having a switch input and a switch output;
an NFC front end chip;
a second battery;
wherein the switch input is ohmically coupled to the NFC antenna when the switch is in a conductive state and a nonconductive state;
wherein power is provided from the NFC antenna to the battery via the switch output when the switch is in the conductive state; and
wherein the status code is accessible from outside the sealed package via the NFC antenna;
wherein the NFC front end chip stores instructions to: (i) receive a command from the NFC antenna when the NFC front end chip is in a card emulator mode; (ii) alter a state of the switch from a nonconductive state to a conductive state upon receipt of the command; (iii) alter the state of the switch from the conductive state to the nonconductive state upon receipt of a termination command;
wherein the switch input is ohmically coupled to the second battery when the switch is in the conductive state and the nonconductive state; and
wherein power is provided from the second battery to the microcontroller when the switch is in the conductive state.

49. The apparatus of claim 48, wherein:
the termination command is received by the NFC antenna.

50. The apparatus of claim 48, further comprising:
a tamper mesh;
a tamper sensor: (i) communicatively coupled to the tamper mesh; (ii) powered by the battery; and (iii) located in the microcontroller;
wherein the tamper sensor includes logic to: (i) remove power to a volatile memory of the microcontroller when a tamper is detected by the tamper mesh; and (ii) to write the status code to the electrically programmable memory;

wherein the status code indicates a tamper; and wherein the electrically programmable memory is non-volatile.

51. The apparatus of claim 48, further comprising:

a status monitoring circuit located in the microcontroller; and a set of instructions stored on the microcontroller for execution by the status monitoring circuit to periodically refresh the status code in the electrically programmable memory;

wherein the electrically programmable memory is non-volatile.

52. The apparatus of claim 48, further comprising:

a real time clock implemented in the microcontroller; and wherein the status code is generated and refreshed using the real time clock.

53. The apparatus of claim 48, further comprising:

a status monitoring circuit located in the microcontroller;

a set of instructions stored on the microcontroller for execution by the status monitoring circuit to periodically refresh the status code in the electrically programmable memory;

wherein the electrically programmable memory is volatile;

wherein the microcontroller is communicatively coupled to the NFC antenna via the NFC front end chip; and wherein the status monitoring circuit and the NFC front end chip are both configured to receive power via the NFC antenna when the status code is accessed from outside the sealed package.

54. The apparatus of claim 48, wherein:

the microcontroller is communicatively coupled to the NFC antenna via the NFC front end chip; and the NFC front end chip stores instructions to: (i) request the status code from the microcontroller and present the status code to the NFC antenna when the NFC front end chip is in a card emulator mode; and (ii) provide payment information to the microcontroller when the NFC front end chip is in a card reader mode.

55. The apparatus of claim 48, further comprising:

an applications processor;

wherein the applications processor stores instructions to instantiate an operating system for the device; and wherein the battery is not ohmically coupled to the applications processor and does not provide power to the applications processor when the operating system is instantiated.

* * * * *